(12) United States Patent
Griffin et al.

(10) Patent No.: US 11,965,546 B2
(45) Date of Patent: Apr. 23, 2024

(54) BEARING MODULE FOR COAXIAL SHAFT ENDS

(71) Applicant: Schaeffler Technologies AG & Co. KG, Herzogenaurach (DE)

(72) Inventors: Joseph T. Griffin, Monroe, NC (US); Florin Muscas, Sterling Heights, MI (US); Arjun Kailassh Magalingam Adithyan, Fort Mill, SC (US); Alfred Thomas, Mount Hill, SC (US); James Brown, Rock Hill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 105 days.

(21) Appl. No.: 17/869,893

(22) Filed: Jul. 21, 2022

(65) Prior Publication Data

US 2024/0026923 A1 Jan. 25, 2024

(51) Int. Cl.
*F16C 19/32* (2006.01)
*F16C 19/38* (2006.01)
(Continued)

(52) U.S. Cl.
CPC ............ *F16C 19/381* (2013.01); *F16C 19/32* (2013.01); *F16C 19/505* (2013.01);
(Continued)

(58) Field of Classification Search
CPC ........ F16C 19/12; F16C 19/188; F16C 19/32; F16C 19/381; F16C 19/505; F16C 33/40;
(Continued)

(56) References Cited

U.S. PATENT DOCUMENTS

| 3,168,359 | A | * | 2/1965 | William | F16C 19/49 384/454 |
| RE29,583 | E | * | 3/1978 | Eckhardt | F16C 19/381 384/455 |

(Continued)

FOREIGN PATENT DOCUMENTS

| DE | 102013210693 A1 * | 12/2014 | F16C 19/32 |
| DE | 102016203656 A1 * | 9/2017 | |

(Continued)

*Primary Examiner* — Phillip A Johnson
(74) *Attorney, Agent, or Firm* — Volpe Koenig (57) ABSTRACT

A bearing module that supports adjacent ends of coaxial shafts, includes an outer ring having first and second axially adjacent raceways and first and second flanges located at the respective ends. A first group of rolling elements rolls on the first raceway, and a second group of rolling elements rolls on the second raceway. A first cage retains the first group of rolling elements circumferentially spaced apart from one another, and a second cage retains the second group of rolling elements. An axial bearing is retained axially between the first and second groups of rolling elements, and has axial bearing rolling elements that are configured for rolling contact with (a) facing axial side raceways on first and second inner rings supported respectively on the first and second groups of rolling elements, (b) the adjacent ends of the two coaxial shafts, or (c) integral washers of the axial bearing.

16 Claims, 6 Drawing Sheets

(51) Int. Cl.
*F16C 19/50* (2006.01)
*F16C 33/46* (2006.01)
*F16C 33/48* (2006.01)
*F16C 33/58* (2006.01)

(52) U.S. Cl.
CPC .......... *F16C 33/4605* (2013.01); *F16C 33/48* (2013.01); *F16C 33/585* (2013.01)

(58) Field of Classification Search
CPC .... F16C 33/405; F16C 33/4605; F16C 33/48; F16C 33/585
See application file for complete search history.

(56) References Cited

U.S. PATENT DOCUMENTS 8,235,597 B2 * 8/2012 Draser .................. F16C 19/381
384/455
2016/0327086 A1 * 11/2016 Brzezinski .............. F16C 43/04

FOREIGN PATENT DOCUMENTS

| JP | 2002206525 | A | * | 7/2002 | ............ F16C 19/381 |
| JP | 2006070909 | A | * | 3/2006 | ............ F16C 19/381 |
| JP | 2009068679 | A | * | 4/2009 | ............ F16C 19/381 |

* cited by examiner

BEARING MODULE FOR COAXIAL SHAFT ENDS

FIELD OF INVENTION

The present disclosure relates to a bearing arrangement for supporting coaxial shaft ends. More particularly, the disclosure is directed to a bearing module used to support adjacent ends of two coaxial shafts, for example as used in an e-axle.

BACKGROUND

For certain applications, including e-axles, two pairs of shafts are provided, with each pair of shafts being located on a same axis and located end to end. Each shaft has a bearing at each end, to hold the shafts in the proper position for operation and to transfer operating loads to the transmission case. Each pair of shafts then includes separate bearings at the outermost (outboard) locations and innermost (inboard) locations on the shafts. Depending on the specific application, the two inboard bearings could be configured to (a) transfer both axial and radial loads to the surrounding casing, (b) transfer radial loads only to the casing and axial loads via the abutting shaft ends, or (c) transfer radial loads only to the casing and provide a separate axial bearing to transfer axial loads between the abutting shaft ends.

It would be desirable to provide a bearing arrangement that can provide the required support for adjacent coaxial shaft ends with better functionality and a reduced part count.

SUMMARY

In order to reduce friction, reduce part count, and ease assembly requirements, a bearing module is provided that is configured to support adjacent ends of two coaxial shafts. The bearing module includes an outer ring having first and second raceways that are axially adjacent to one another as well as first and second flanges located at each respective end of the outer ring. First and second groups of rolling elements are provided, with the first group of rolling elements being configured for rolling on the first raceway and being axially constrained by the first flange, and with the second group of rolling elements being configured for rolling on the second raceway and being axially constrained by the second flange. A first cage is provided that retains the first group of rolling elements circumferentially spaced apart from one another, and a second cage is provided that retains the second group of rolling elements circumferentially spaced apart from one another. An axial (thrust) bearing is retained axially between the first and second groups of rolling elements, with the axial bearing including axial bearing rolling elements that are configured for rolling contact with (a) facing axial side raceways on first and second inner rings supported respectively on the first and second groups of rolling elements, (b) the adjacent ends of the two coaxial shafts, or (c) integral washers of the axial bearing that contact either the inner rings or the adjacent ends of the two coaxial shafts.

With this arrangement, the two radial bearings and the axial bearing are held in the proper position between the two shafts, and the axial bearing is captured between the two radial bearings within the one-piece outer.

In one embodiment, the outer ring further comprises a center flange located axially between the first and second raceways. In this case, the first flange and the center flange preferably provide piloting for the first cage, and the second flange and the center flange preferably provide piloting for the second cage.

The axial bearing preferably includes an axial bearing cage that retains the axial bearing rolling elements circumferentially spaced apart from one another.

In one embodiment with the center flange, the center flange provides piloting on the radially outer surface of the axial bearing cage.

In one embodiment, the first group of rolling elements provides piloting for the first cage, and the second group of rolling elements provides piloting for the second cage.

In one embodiment, the first and second inner rings are provided and are configured to receive the ends of the two coaxial shafts and are supported respectively on the first and second groups of rolling elements which have rolling contact with the respective first and second raceways of the first and second inner rings.

In another embodiment, the axial bearing includes integral washers having raceways, and the axial bearing rolling elements contact the raceways of the integral washers. The axially outwardly facing sides of the washers can then contact the adjacent ends of the two coaxial shafts or the first and second inner rings. This eliminates the need for special surface finishing either on the axial sides of the inner rings or axial ends of the shafts for direct contact with the axial bearing rolling elements.

In one embodiment, the first and second raceways are formed as a single continuous raceway, and a radially outer surface of the axial bearing cage is piloted on the continuous raceway between the first and second raceways.

For the e-axle application, two bearings are provided at the outboard locations on the coaxial shafts that can transfer both radial and axial forces to the casing. The present bearing module is then used at the inboard location between the adjacent ends of the two coaxial shafts and only transfers radial forces to the casing, and the axial bearing in the bearing module transfers axial forces between the two shafts.

In another aspect, a method of assembling a bearing module that is configured for supporting adjacent ends of two coaxial shafts is provided. The method includes: (a) providing a precision ground outer ring having first and second raceways that are axially adjacent to one another, and first and second flanges located at each respective end of the outer ring, with a center flange located axially between the first and second flanges; (b) inserting a first cage into position radially inside the first raceway; (c) inserting a first group of rolling elements radially into the first cage; (d) inserting an axial bearing into the outer ring from a side of the second raceway; (e) inserting a second cage into position radially inside the second raceway; and (f) inserting a second group of rolling elements radially into the second cage, capturing the axial bearing. The radial bearings are also captured in position with the rolling elements held axially by the first flange and the center flange or the center flange and the second flange, and radially by the respective first and second cages.

The method can optionally include the axial bearing having an axial bearing cage that retains axial bearing rolling elements circumferentially spaced apart from one another, and piloting the axial bearing cage via a radially outer surface thereof contacting the center flange.

The method can also optionally include piloting the first cage on the first flange and the center flange, and piloting the second cage on the second flange and the center flange.

In another aspect an alternative method of assembling a bearing module that is configured for supporting adjacent ends of two coaxial shafts is provided where the outer ring is a formed, preferably deep drawn, part. Here, the method includes: (a) providing an outer ring having a first flange at a first axial end and having first and second raceways that are axially adjacent to one another; (b) inserting a first radial bearing having a first cage with a first group of rolling elements retained therein from a second axial end of the outer ring; (c) then inserting an axial bearing into the outer ring from the second axial end; (d) then inserting a second radial bearing having a second cage with a second group of rolling elements retained therein from the second axial end of the outer ring; and (e) forming a second flange at the second axial end of the outer ring to close the outer ring and retain the first radial bearing, the axial bearing, and the second radial bearing together as the bearing module.

In this case, the method can optionally further include that the first and second raceways are formed as a single continuous raceway.

The method can further optionally include that the axial bearing has an axial bearing cage that retains axial bearing rolling elements circumferentially spaced apart from one another, and piloting the axial bearing via a radially outer surface of the axial bearing cage contacting the continuous raceway between the first and second raceways.

Various ones of the disclosed features can be combined with one another in order to provide additional functionality. Additional embodiments are also disclosed herein.

BRIEF DESCRIPTION OF THE DRAWINGS

The foregoing Summary and the following Detailed Description will be better understood when read in conjunction with the appended drawings, which illustrate an exemplary embodiment of the disclosure. In the drawings.

DETAILED DESCRIPTION

Certain terminology is used in the following description for convenience only and is not limiting. "Axially" refers to a direction along an axis of an assembly. "Radially" refers to a direction inward and outward from the axis of the assembly. "Circumferentially" refers to a direction extending along a curve or circumference of a respective element relative to the axis of the assembly. The terms "about" and "approximately" encompass + or −10% of an indicated value unless otherwise noted. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
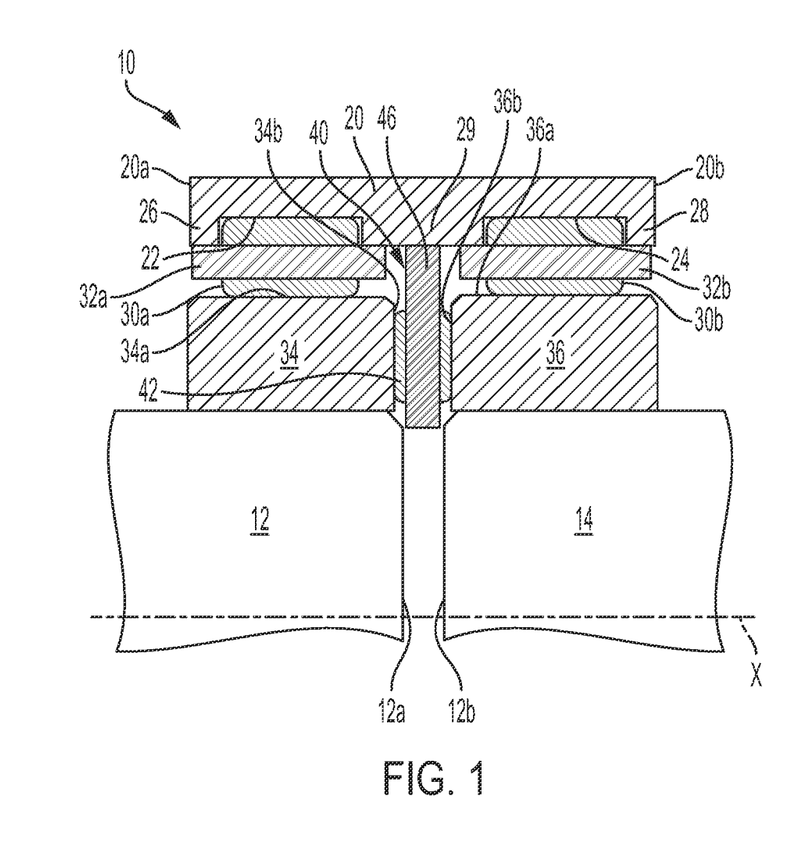
FIG. 1 is a cross-sectional view of the first embodiment of a bearing module according to the present disclosure.
Figure 2:
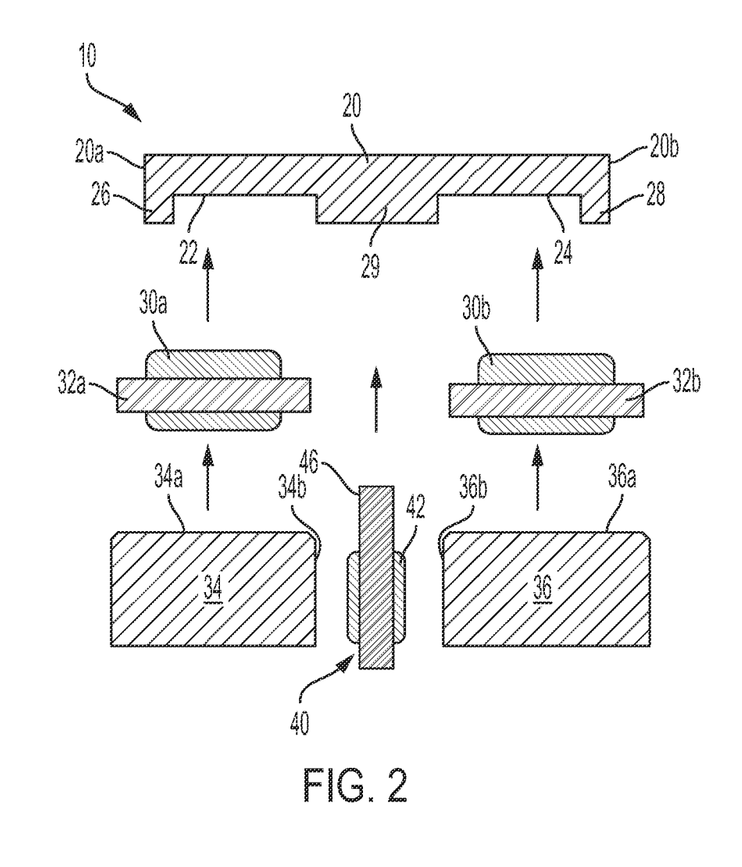
FIG. 2 is a cross-sectional view showing the individual components of the bearing module of FIG. 1 in an exploded view.
Figure 3:
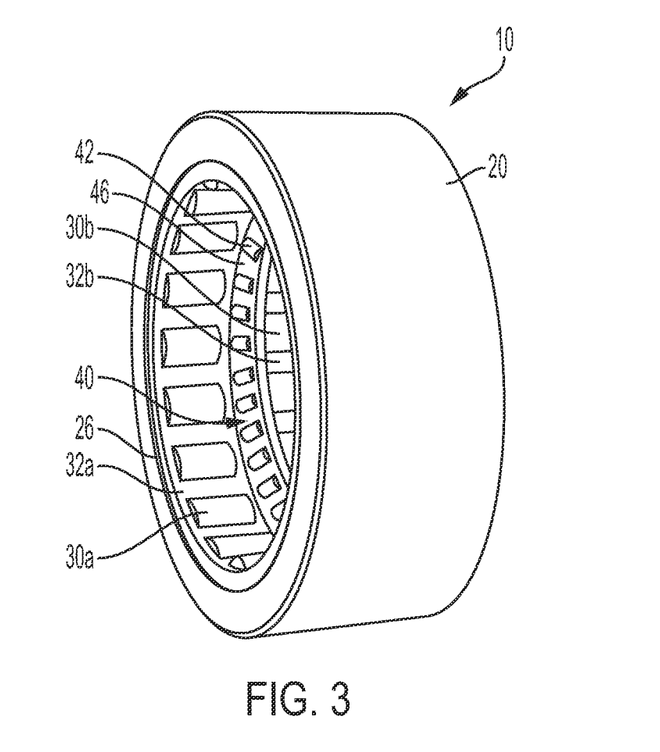
FIG. 3 is a perspective view of the bearing module shown in FIG. 1 without the two coaxial shafts shown supported therein.

Referring to FIGS. 1-3, a first embodiment of a bearing module 10 is shown that is configured to support adjacent ends 12a, 14a of two coaxial shafts 12, 14 that are located along an axis X.

As shown FIGS. 1-3, the bearing module 10 includes an outer ring 20 having first and second raceways 22, 24 that are axially adjacent to one another. First and second flanges 26, 28 are located at each respective axial end 20a, 20b of the outer ring 20. The first and second groups of rolling elements 30a, 30b are provided, with the first group of rolling elements 30a be configured for rolling on the first raceway 22 and being axially constrained, at least in one direction, by the first flange 26. The second group of rolling elements 30b is configured for rolling on the second raceway 24, and is axially constrained, at least in the opposite axial direction, by the second flange 28. In the first embodiment of the bearing module 10, the outer ring 20 further includes a center flange 29 located axially between the first and second raceways 22, 24.

The outer ring 20 is preferably made of a bearing grade steel. This can be precision machined and ground to achieve the desired surface finish in the raceways, and heat treated and tempered to provide the desired strength and hardness, or can be otherwise formed as discussed in detail further below.

A first cage 32a contains the first group of rolling elements 30a circumferentially spaced apart from one another, and a second cage 32b retains the second group of rolling elements 30b circumferentially spaced apart from one another. The first and second cages 32a, 32b can be molded from a polymeric material or can be made from a stamped or otherwise formed sheet metal part.

Still with reference to FIG. 1, in the first embodiment of the bearing module 10, the first group of rolling elements 30a is axially constrained by the first flange 26 in one direction and by the center flange 29 in the opposite axial direction, and the second group of rolling elements 30b is axially constrained in one direction by the second flange 28 and in the opposite axial direction by the center flange 29.

Still with reference to FIGS. 1-3, an axial bearing 40 is retained axially between the first and second groups of rolling elements 30a, 30b. The axial bearing 40 includes axial bearing rolling elements 42 that are configured for rolling contact with facing first and second axial side raceways 34b, 36b on first and second inner rings 34, 36 that are supported respectively on the first and second groups of rolling elements 30a, 30b. In the first embodiment, these first and second inner rings 34, 36 are configured to receive the ends 12a, 14a of the two coaxial shafts 12, 14 and are supported respectively on the first and second groups of rolling elements 30a, 30b which have rolling contact with respect to first and second raceways 34a, 36a of the first and second inner rings 34, 36.

In this first embodiment of the bearing module 10, facing axial side raceways 34b, 36b are provided on the first and second inner rings 34, 36 that are precision ground to provide a suitable surface finish on which the axial bearing rolling elements 42 can roll in order to transmit axial forces between the adjacent ends 12a, 14a of the first and second coaxial shafts 12, 14.

The inner rings 34, 36 are preferably made of bearing grade steel and are precision ground and heat treated and tempered to provide the required surface finish, strength, and hardness for the particular application.

Still with reference to FIG. 1, preferably, the first flange 26 and the center flange 29 provide piloting for the first cage 32a, and the second flange 28 and the center flange 29 provide piloting for the second cage 32b. This piloting is radial guidance provided for the first and second cages 32a, 32b on the respective inner surfaces of the first flange 26, the second flange 28, and the center flange 29.

Additionally, as shown in FIG. 1, the axial bearing 40 preferably also incudes an axial bearing cage 46 that retains the axial bearing rolling elements 42 circumferentially spaced part from one another. Here, the center flange 29 also provides piloting on a radially outer surface 46a of the axial bearing cage 46, maintaining the radial position of the axial bearing 40. The axial bearing cage 46 is preferably made of a stamped sheet metal part. However, it can also be formed of a polymeric material.

Here the first group of rolling elements 30a provides piloting for the first cage 32a in the axial direction and the second group of rolling elements 30b provides piloting for the second cage 32b in the axial direction. This is achieved via the location of the first and second raceways 22, 24 respectively between the first flange 26 and the center flange 29 and the center flange 29 and the second flange 28.

Figure 4:
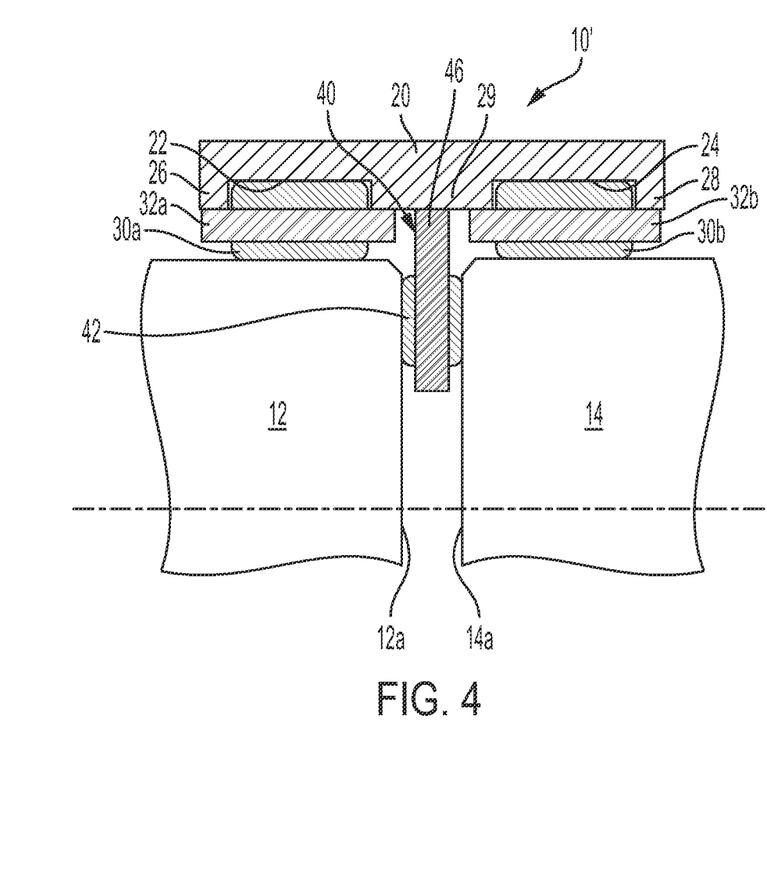
FIG. 4 is a cross-sectional view through a second embodiment of bearing module according to the present disclosure.

Referring to FIG. 4, a second embodiment 10' of the bearing module is shown. The second embodiment of the bearing module 10' is similar to the first embodiment of the bearing module 10 except that the inner rings are omitted and the axial bearing rolling elements 42 are configured for rolling contact with the adjacent ends 12a, 14a of the two coaxial shafts 12, 14. Otherwise, the bearing module 10' is configured in a similar manner as discussed above and like elements are used to identify like features.

Figure 5:
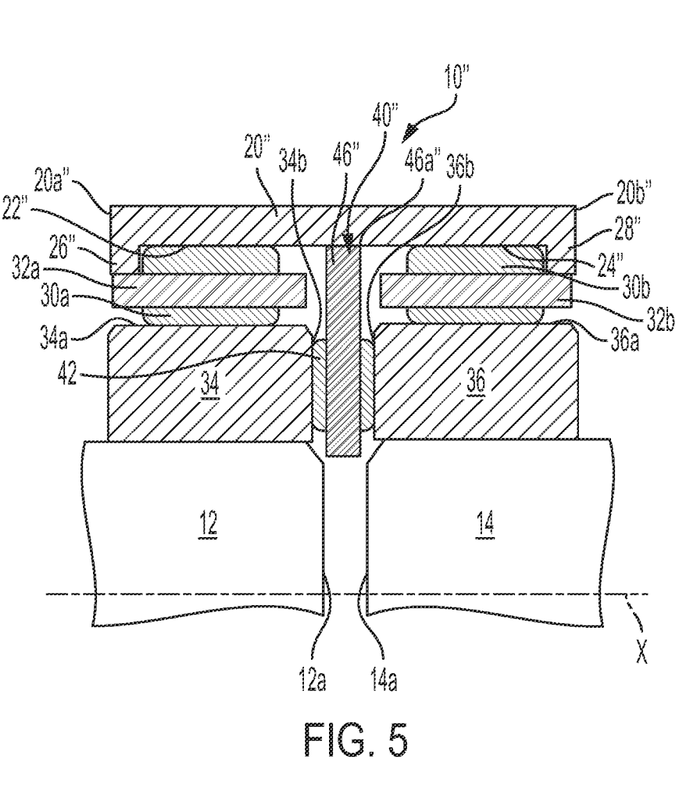
FIG. 5 is a cross-sectional view through a third embodiment of a bearing module in accordance with the present disclosure.

Referring now to FIG. 5, a third embodiment of a bearing module 10" is shown. The third embodiment of the bearing module 10" is similar to the first embodiment of the bearing module 10 and like elements have been indicated with like numerals throughout. Elements with modified form are designated with ". In the third embodiment of the bearing module 10", the first and second raceways 22", 24" are formed in the outer ring 20" as a single continuous raceway and the center flange 29 is omitted. Here, a radially outer surface 46a" of the axial bearing cage 46" of the axial bearing 40" is piloted on the continuous raceway formed between the first and second raceways 22", 24". In this case, the bearing module 10" includes the first and second inner rings 34, 36 that are configured to receive the ends 12a, 14a of the two coaxial shafts 12, 14. This arrangement allows the outer ring 20" to be formed as a drawn part in which the first flange 26" is formed at the first axial end 20a" of the circumferential body of the outer ring 20". The first radial bearing, formed by the first cage 32a along with the first group of rolling elements 30a retained therein, is inserted from a second axial end 20b" of the outer ring 20", the axial bearing 40" is inserted from the second axial end 20b", and then the second radial bearing, formed by the second cage 32b with the second group of rolling elements 30b retained therein, is also inserted from the second axial and 20b" prior to forming the second flange 28" at the second axial end 20b" of the outer ring 20" to close the outer ring 20" and retain the first radial bearing (formed by the first cage 32a along with the first group of rolling elements 30a), the axial bearing 40" and the second radial bearing (formed by the second cage 32b with the second group of rolling elements 30b) together as the bearing module 10".

Figure 6:
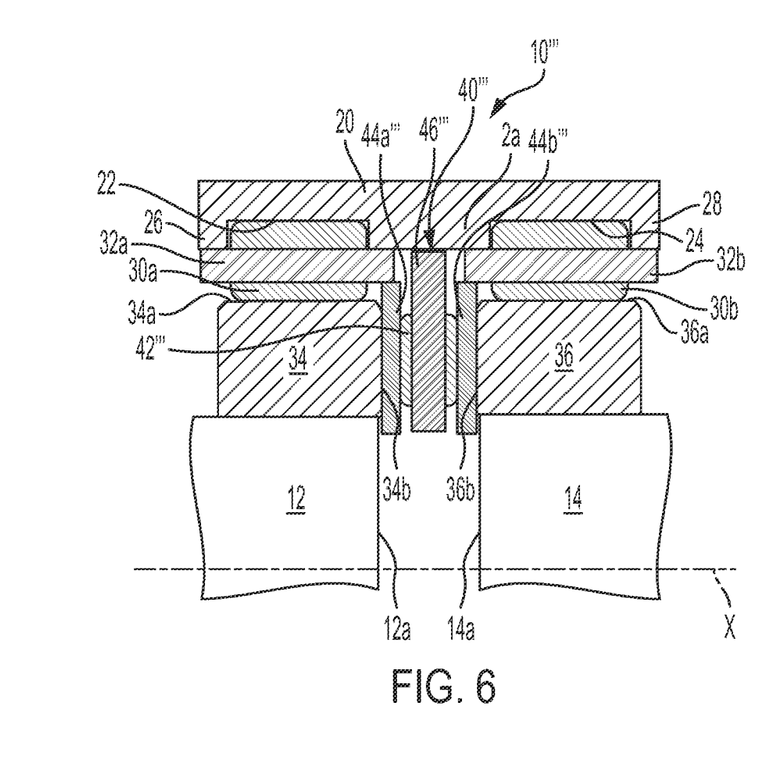
FIG. 6 is cross-sectional view through a fourth embodiment of a bearing module in accordance with the present disclosure.

Referring to FIG. 6, a fourth embodiment of the bearing module 10''' is shown. The fourth embodiment of the bearing module 10''' is similar to the first embodiment 10 except that the axial bearing 40''' is provided with integral washers 44a''', 44b''' on both axial sides. These integral washers 44a''', 44b''' provide raceways for the axial bearing rolling elements 42''' that are held in the cage 46''', avoiding the need for any special surface finish on the axial sides 34b, 36b of the first and second inner rings 34, 36. Otherwise, the arrangement functions in the same manner as the first embodiment of the bearing module 10. It is also noted that the axial bearing 40''' including the integral washes 44a''', 44b''' could be used in the arrangement of FIG. 4 with the integral washers 44a''', 44b''' bearing directly against the axial ends 12a, 14a of the two coaxial shafts 12, 14.

A first method assembling a bearing module 10 that is configured for supporting adjacent ends 12a, 12b of the two coaxial shafts 12, 14 is also provided. The method includes:

Providing a precision ground outer ring 20 having first and second raceways 22, 24 that are axially adjacent to one another, and the first and second flanges 26, 28 located at each respective axial end 20a, 20b of the outer ring 20, and the center flange 29 located axially between the first and second flanges 26, 28;

Inserting the first cage 32a into position radially inside the first raceway 22;

Inserting the first group of rolling elements 30a radially into the first cage 32a;

Inserting the axial bearing 40 into the outer ring 20 from a side of the second raceway 24;

Inserting the second cage 32b into position radially inside the second raceway 24; and Inserting the second group of rolling elements 30b radially into the second cage 32b capturing the axial bearing.

Here, as shown in FIG. 1, the first and second cages 32a, 34a hold the respective groups of rolling elements 30a, 30b radially in position between the respective first flange 26 and center flange 29, and the center flange 29 and second flange 28. The flanges 26, 28, 29 hold the rolling elements 30a, 30b axially in position while capturing the axial bearing 40 therebetween. To the extent that the first and second inner rings 34, 36 are utilized, for example as shown in FIG. 1, these can then be inserted. Alternatively, if the inner rings, 34, 36 are omitted as shown in FIG. 4, no further action is required in this regard.

The method can also include piloting the axial bearing cage 46 via the radially outer surface 46a contacting the center flange 29.

Additionally, the method can include piloting the first cage 32a on the first flange 26 and the center flange 29, as well as piloting the second cage 32b on the second flange 26 and the center flange 29.

An alternate method of assembling the bearing module, which is particularly appropriate for the third embodiment of the bearing module 10" shown in FIG. 5 is also provided. This method includes:

Providing an outer ring 20" having a first flange 26" at a first axial and 20a" and having first and second raceways 22", 24" that are axially adjacent to one another;

Inserting a first radial bearing formed from the first cage 32a with the first group of rolling elements 30a retained therein from a second axial end 20b" of the outer ring 20";

Then inserting the axial bearing 40 into the outer ring 20" from the second axial end 20b";

Then inserting the second radial bearing that is formed from the second cage 32b with the second group of rolling elements 30b retained therein from the second axial and 20b" of the outer ring 20"; and Forming the second flange 28" at the second axial end 20b" of the outer ring 20" to close the outer ring 20" and the retain the first radial bearing (formed from the first group of rolling element 30, and first cage 32a), the axial bearing 40, and the second radial bearing (formed from the second group of rolling elements 30b and the second cage 32b) together as the bearing module 10".

This method can further include forming the first and second raceways 22", 24" as a single continuous raceway.

The method can also further include piloting the axial bearing 40 via a radially outer surface 46a of the axial bearing cage 46 contacting the continuous raceway.

Having thus described the embodiments in accordance with the present disclosure in detail, it is to be appreciated and will be apparent to those skilled in the art that many physical changes, only a few of which are exemplified in the detailed description of the exemplary embodiment, could be made without altering the concepts and principles embodied therein. It is also to be appreciated that numerous embodiments incorporating only part of the exemplary embodiment are possible which do not alter, with respect to those parts, the inventive concepts and principles embodied therein. The exemplary embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LIST OF REFERENCE NUMERALS

10, 10', 10", 10''' Bearing Module
12 Shaft
12a Shaft End
14 Shaft
14a Shaft End
20" Outer Ring
20a" First Axial End
20b" Second Axial End
22, 22" First Raceway
24, 24" Second Raceway
26, 26" First Flange
28, 28" Second Flange
29 Center Flange
30a First Group of Rolling Elements
30b Second Group of Rolling Elements
32a First Cage
32b Second Cage
34 First Inner Ring
34a First Raceway
34b First Axial side raceway
36 Second Inner Ring
36a Second Raceway
36b Second Axial Side Raceway
40", 40''' Axial Bearing
42, 42''' Axial Bearing Rolling Elements
44a''' Integral Washer
44b''' Integral Washer
46 Axial Bearing Cage
46a Radially Outer Surface
X-Axis

The invention claimed is:

1. A bearing module configured to support adjacent ends of two coaxial shafts, the bearing module comprising:
an outer ring having first and second raceways that are axially adjacent to one another;
first and second flanges located at each respective end of the outer ring;
first and second groups of rolling elements, the first group of rolling elements being configured for rolling on the first raceway and being axially constrained by the first flange, and the second group of rolling elements being configured for rolling on the second raceway and being axially constrained by the second flange;
a first cage that retains the first group of rolling elements circumferentially spaced apart from one another, and a second cage that retains the second group of rolling elements circumferentially spaced apart from one another; and
an axial bearing retained axially between the first and second groups of rolling elements, the axial bearing including axial bearing rolling elements that are configured for rolling contact with (a) facing axial side raceways on first and second inner rings supported respectively on the first and second groups of rolling elements, (b) the adjacent ends of the two coaxial shafts, or (c) integral washers of the axial bearing.

2. The bearing module of claim 1, wherein the outer ring further comprises a center flange located axially between the first and second raceways, the first group of rolling elements being axially constrained by the first flange and the center flange, and the second group of rolling elements being axially constrained by the second flange and the center flange.

3. The bearing module of claim 2, wherein the first flange and the center flange provide piloting for the first cage, and the second flange and the center flange provide piloting for the second cage.

4. The bearing module of claim 2, wherein the axial bearing includes an axial bearing cage that retains the axial bearing rolling elements circumferentially spaced apart from one another.

5. The bearing module of claim 4, wherein center flange provides piloting on a radially outer surface of the axial bearing cage.

6. The bearing module of claim 1, wherein the first group of rolling elements provides piloting for the first cage, and the second group of rolling elements provides piloting for the second cage.

7. The bearing module of claim 1, further comprising the first and second inner rings configured to receive the ends of the two coaxial shafts that are supported respectively on the first and second groups of rolling elements which have rolling contact with respective first and second raceways of the first and second inner rings.

8. The bearing module of claim 1, wherein the axial bearing includes integral washers having raceways, and the axial bearing rolling elements contact the raceways of the integral washers.

9. The bearing module of claim 1, wherein the axial bearing includes an axial bearing cage that retains the axial bearing rolling elements circumferentially spaced apart from one another.

10. The bearing module of claim 9, wherein the first and second raceways are formed as a single continuous raceway, and a radially outer surface of the axial bearing cage is piloted on the continuous raceway between the first and second raceways.

11. A method of assembling a bearing module that is configured for supporting adjacent ends of two coaxial shafts, the method comprising:

providing a precision ground outer ring having first and second raceways that are axially adjacent to one another, and first and second flanges located at each respective end of the outer ring, with a center flange located axially between the first and second flanges;

inserting a first cage into position radially inside the first raceway;

inserting a first group of rolling elements radially into the first cage;

inserting an axial bearing into the outer ring from a side of the second raceway;

inserting a second cage into position radially inside the second raceway;

inserting a second group of rolling elements radially into the second cage, capturing the axial bearing.

12. The method of claim 11, wherein the axial bearing includes an axial bearing cage that retains axial bearing rolling elements circumferentially spaced apart from one another, and the method further comprises piloting the axial bearing cage via a radially outer surface thereof contacting the center flange.

13. The method of claim 11, further comprising piloting the first cage on the first flange and the center flange, and piloting the second cage on the second flange and the center flange.

14. A method of assembling a bearing module that is configured for supporting adjacent ends of two coaxial shafts, the method comprising:

providing an outer ring having a first flange at a first axial end and having first and second raceways that are axially adjacent to one another;

inserting a first radial bearing having a first cage with a first group of rolling elements retained therein from a second axial end of the outer ring;

then inserting an axial bearing into the outer ring from the second axial end;

then inserting a second radial bearing having a second cage with a second group of rolling elements retained therein from the second axial end of the outer ring; and forming a second flange at the second axial end of the outer ring to close the outer ring and retain the first radial bearing, the axial bearing and the second radial bearing together as the bearing module.

15. The method of claim 14, wherein the first and second raceways are formed as a single continuous raceway.

16. The method of claim 15, wherein the axial bearing includes an axial bearing cage that retains axial bearing rolling elements circumferentially spaced apart from one another, and the method further comprises piloting the axial bearing via a radially outer surface of the axial bearing cage contacting the continuous raceway.

\* \* \* \* \*